US011721957B2

(12) United States Patent
Simas et al.

(10) Patent No.: US 11,721,957 B2
(45) Date of Patent: Aug. 8, 2023

(54) ELECTRIC SUBMERSIBLE PUMP CABLE TUBING ENCAPSULATED CABLE SPLICE

(71) Applicant: ITT Manufacturing Enterprises LLC, Wilmington, DE (US)

(72) Inventors: Taylor Simas, Santa Rosa, CA (US); Andrew Smith, Santa Rosa, CA (US); Charley Campbell, Santa Rosa, CA (US)

(73) Assignee: ITT MANUFACTURING ENTERPRISES LLC., Wilmington, DE (US)

( * ) Notice: Subject to any disclaimer, the term of this patent is extended or adjusted under 35 U.S.C. 154(b) by 116 days.

(21) Appl. No.: 17/321,642

(22) Filed: May 17, 2021

(65) Prior Publication Data
US 2021/0376580 A1 Dec. 2, 2021

Related U.S. Application Data

(60) Provisional application No. 63/032,818, filed on Jun. 1, 2020.

(51) Int. Cl.
*H02G 1/02* (2006.01)
*H02G 1/00* (2006.01)
*E21B 17/02* (2006.01)
*E21B 17/00* (2006.01)
*E21B 43/12* (2006.01)
*H01B 3/42* (2006.01)

(52) U.S. Cl.
CPC ........... *H02G 1/005* (2013.01); *E21B 17/003* (2013.01); *E21B 17/0285* (2020.05); *E21B 43/128* (2013.01); *H01B 3/427* (2013.01)

(58) Field of Classification Search
CPC .......... H01B 3/427; H01B 7/28; H01B 7/046; H01B 9/02; H01B 9/006; E21B 17/0285; E21B 17/003; E21B 43/128; H02G 1/005
USPC ....................................... 174/84 R, 88 R, 92
See application file for complete search history.

(56) References Cited

U.S. PATENT DOCUMENTS

| 3,187,088 | A | * | 6/1965 | Warner | H02G 15/24 174/91 |
| 3,614,289 | A | * | 10/1971 | Kothe | H02G 15/068 174/9 R |
| 4,496,795 | A | * | 1/1985 | Konnik | H02G 15/10 428/377 |
| 5,478,970 | A | * | 12/1995 | Lawler | E21B 17/023 174/77 R |
| 7,049,506 | B2 | * | 5/2006 | Head | E21B 17/028 174/102 R |

(Continued)

*Primary Examiner* — William H. Mayo, III
(74) *Attorney, Agent, or Firm* — Mannava & Kang, P.C.

(57) ABSTRACT

A cable splice assembly includes a tubing encapsulated cable, an electric submersible downhole cable, where the tubing encapsulated cable and the electric submersible downhole cable are tape-spliced through a pair of respective contacts, and a thermoplastic insulator to seal the tubing encapsulated cable. A shell contains the tape-spliced tubing encapsulated cable and the electric submersible downhole cable and multiple layers of sealant tape are wrapped around at least the tubing encapsulated cable and the thermoplastic insulator inside the shell, where a number of layers of the sealant tape is selected to create a pressure blocking seal inside the shell.

19 Claims, 4 Drawing Sheets

(56) References Cited

U.S. PATENT DOCUMENTS

| | | | | |
|---|---|---|---|---|
| 7,405,358 B2* | 7/2008 | Emerson | ............ | H01R 13/5216 |
| | | | | 174/88 R |
| 8,209,855 B2* | 7/2012 | Hilberts | ................... | H01R 4/20 |
| | | | | 29/869 |
| 10,689,917 B2* | 6/2020 | Emerson | ................. | E21B 33/02 |
| 2019/0103204 A1* | 4/2019 | Von Fange | ........... | H02G 15/117 |

* cited by examiner

ELECTRIC SUBMERSIBLE PUMP CABLE TUBING ENCAPSULATED CABLE SPLICE

This application claims the benefit of U.S. Provisional Patent Application Ser. No. 63/032,818 filed on Jun. 1, 2020. The disclosures of the above application are hereby incorporated by reference for all purposes.

BACKGROUND

Unless otherwise indicated herein, the materials described in this section are not prior art to the claims in this application and are not admitted as prior art by inclusion in this section.

Oil and similar underground extraction systems include electrical submersible pumps and other equipment that operate in a drill hole submerged in a fluid (e.g., oil, water, oil-water mixture, etc.). Such equipment, in addition to being submerged, are typically subject to high pressures and/or high temperatures. Power to the submersible equipment is provided through downhole and surface cables that are spliced inside the wellhead or in the vicinity of the wellhead. Various methods of fortifying the cables at their splicing location may include use of epoxy, steel tubing, etc., but add complexity and/or cost to the system.

SUMMARY

The present disclosure generally describes a method and apparatus to splice an electric submersible pump cable and a tubing encapsulated surface-side cable.

According to some examples, a cable splice assembly includes a tubing encapsulated cable; an electric submersible downhole cable, where the tubing encapsulated cable and the electric submersible downhole cable are tape-spliced through a pair of respective contacts; a thermoplastic insulator to seal the tubing encapsulated cable; a shell to contain the tape-spliced tubing encapsulated cable and the electric submersible downhole cable; and multiple layers of sealant tape wrapped around at least the tubing encapsulated cable and the thermoplastic insulator inside the shell, where a number of layers of the sealant tape is selected to create a pressure blocking seal inside the shell.

According to other examples, a method to form a cable splice assembly includes affixing a thermoplastic insulator to a tubing encapsulated cable; electrically coupling the tubing encapsulated cable and an electric submersible downhole cable inside the thermoplastic insulator; wrapping multiple layers of sealant tape around at least the tubing encapsulated cable and the thermoplastic insulator, where a thickness of the sealant tape is increased in stages starting around the thermoplastic insulator and in a direction of a wellhead; and disposing the electrically coupled portions of the tubing encapsulated cable and the electric submersible downhole cable inside a shell, where a thickness of the sealant tape is selected to create a pressure blocking seal inside the shell.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
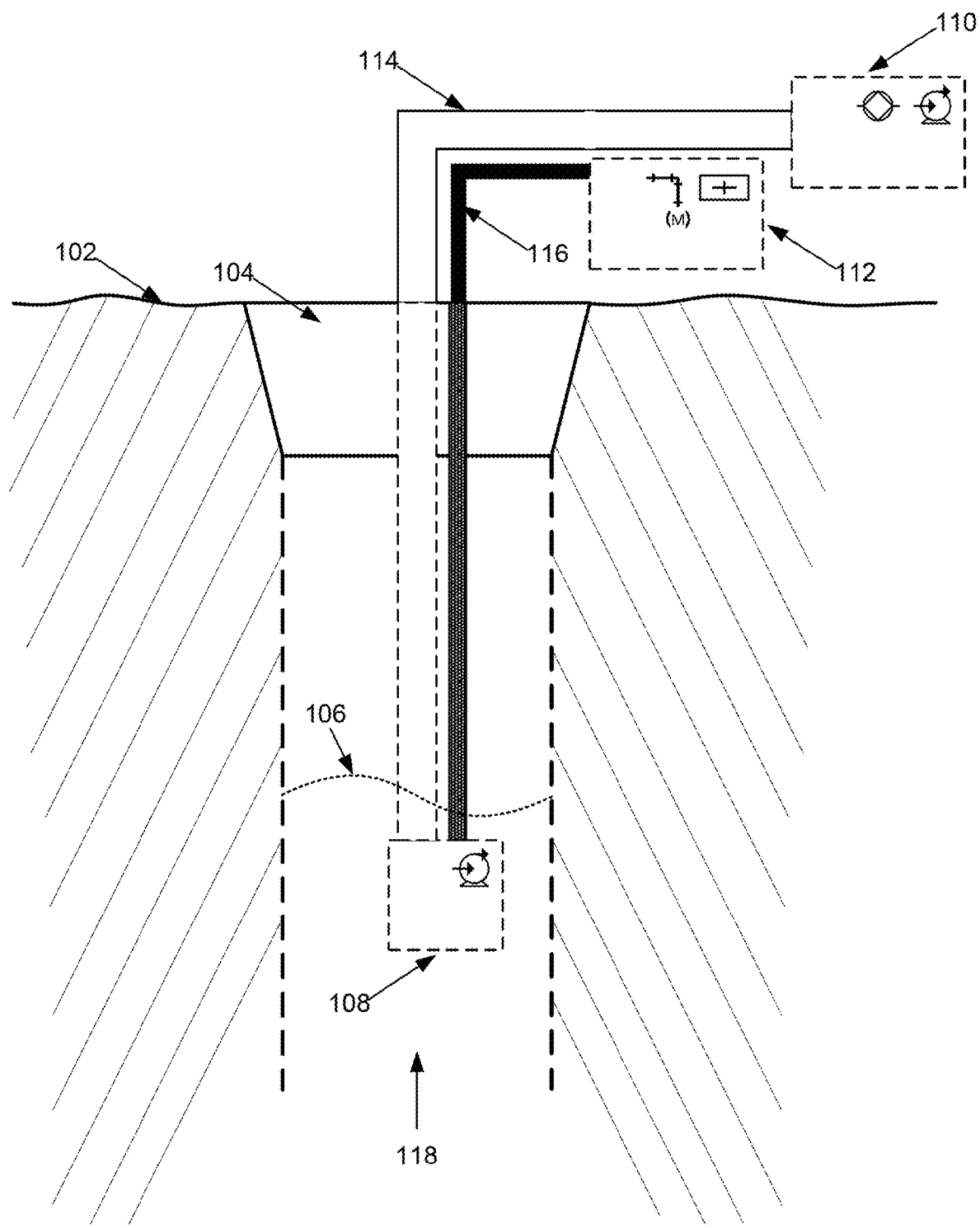
FIG. 1 illustrates a cross-sectional view of a well and wellhead with example equipment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems and/or devices related to splicing an electric submersible pump cable and a tubing encapsulated surface-side cable.

FIG. 1 illustrates a cross-sectional view of a well and wellhead with example equipment, arranged in accordance with at least some embodiments described herein.

As shown in FIG. 1, a wellhead 104 may be placed on a well 118, which is bored into ground 102. In-well equipment, such as downhole pump 108 and similar ones, may be submerged in fluid 106 (gas or liquid) and have one or more fluidic couplings 114 (e.g., via a fluid coupler such as a pipe, tube, channel or conduit) to surface mechanical equipment 110 such as pumps, filters, compressors, etc. In-well equipment may also have one or more electrical couplings 116 (e.g., an electrical coupler or conductor such as a wire, cord, line, or cable) to surface electrical devices or systems 112 such as power supplies, controllers, amplifiers, switches, etc.

Oil and gas wells include electric submerged pumps pumping fluids into the well, and gas and oil flows out of the well. The gases (and oil) create an environment that may be susceptible to fire and explosions. Thus, wellhead equipment is typically designed and implemented to prevent leakage. Some example systems use a cable splice that utilizes either rubber sleeves or a seal that mates within a thermoplastic insulator to isolate the connection and maintain well pressure. Embodiments employ multiple layers of tape over an electric submersible pump cable and an insulator then transition to a tubing encapsulated cable. The cable splices may be inserted directly into wellhead hanger bores or may be assembled into housings that seal directly (via O-rings or pipe threads) to existing features in a wellhead.

Figure 2:
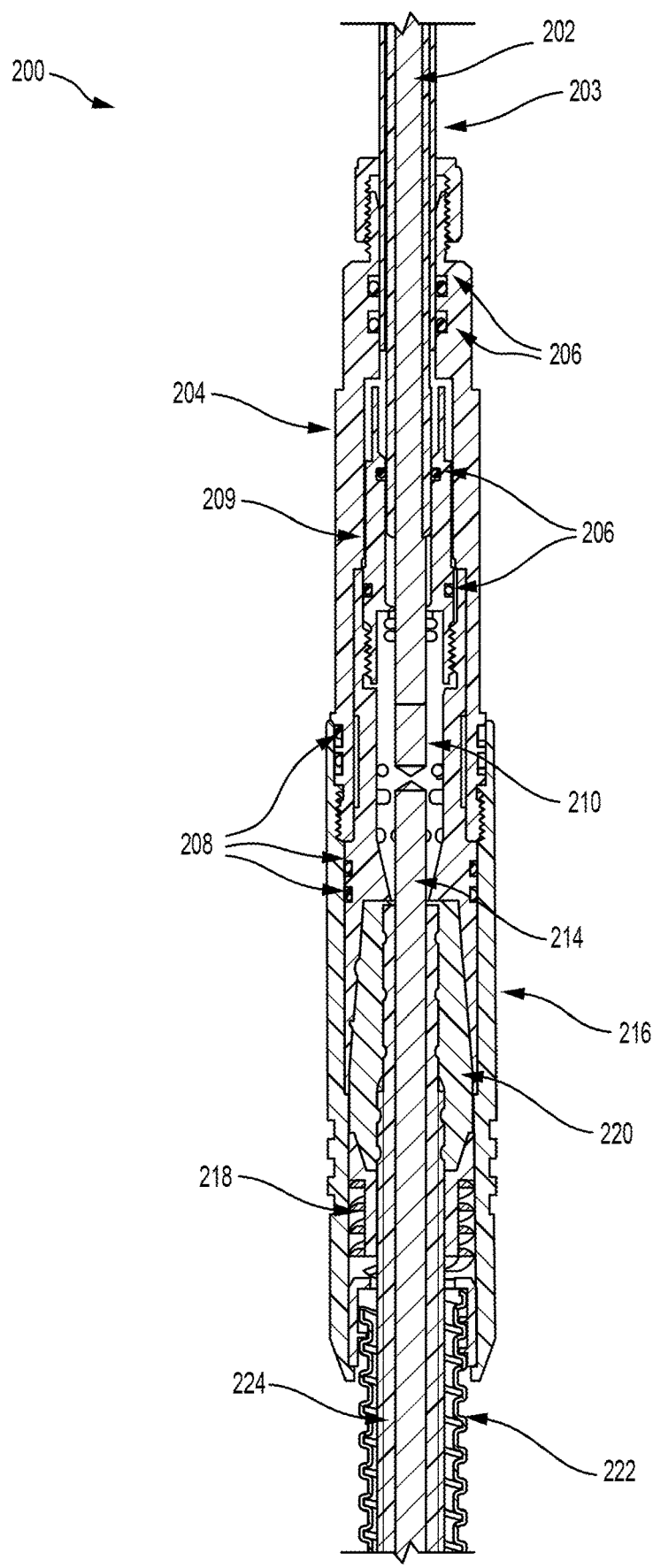
FIG. 2 illustrates a cross-sectional view of a submersible pump cable splice.

FIG. 2 illustrates a cross-sectional view of a submersible pump cable splice.

As shown in diagram 200, conventional wellhead splice systems connect a surface cable 202 with a downhole cable 214 via a crimped or crimp-free contact 210. The conductor of the surface cable 202 is encapsulated in insulator 203 and the conductor of the downhole cable 214 is encapsulated in insulator 224. Downhole cable 214 may be further encapsulated in a lead jacket 222.

The surface cable 202 is further enveloped inside the adapter housing 204 by surface-side insulator 209. The downhole cable 224 is further sealed by rubber bootseal 220 inside the downhole insulator 218. The surface-side insulator 209 and the downhole insulator 218 are coupled in an overlapping fashion, for example, through a threaded coupling. O-rings 206 and 208 provide sealing against leakage of fluids or gases. Conventional systems employ expensive shells and multiple insulators to seal on the surface cable, which leads to larger outside diameter and requires cable specific sized seals for optimal performance.

Figure 3:
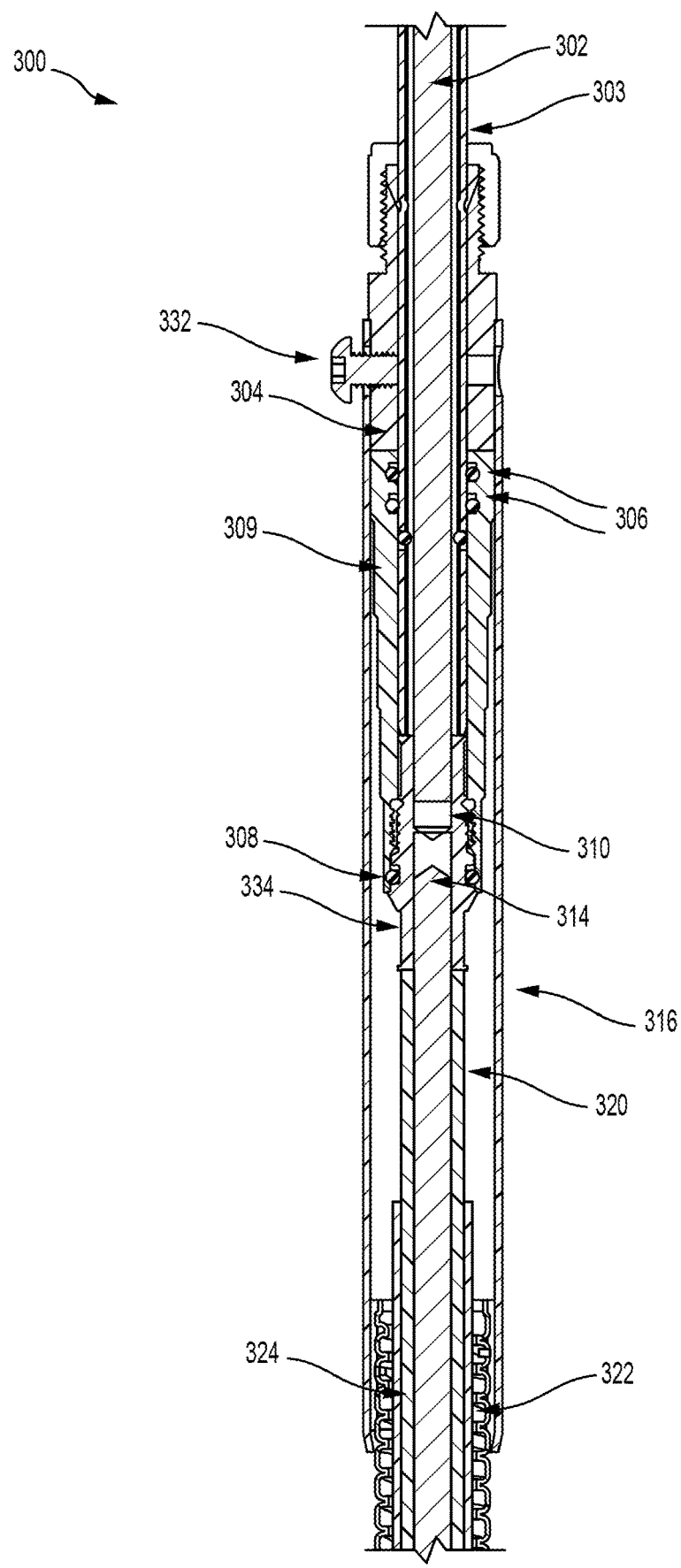
FIG. 3 illustrates a cross-sectional view of a tape splice of an electric submersible pump cable and a tubing encapsulated surface-side cable according to embodiments.

FIG. 3 illustrates a cross-sectional view of a tape splice of an electric submersible pump cable and a tubing encapsulated surface-side cable, arranged in accordance with at least some embodiments described herein.

Diagram 300 shows tubing encapsulated cable 302 with its conductor enveloped by tubing (or conduit) 303. The tubing encapsulated cable is secured through a screw-based or similar mechanism 332, which also seals a top portion of a shell 316. The tubing encapsulated cable and the submersible downhole cable 324 are coupled through crimped or crimp-free contacts 310 and 314, respectively. Multiple layers of sealant tape 309 can be applied to various cable sizes to achieve a pressure blocking insulated seal. The sealant tape 309 is applied overlapping the thermoplastic insulator 334, contacts 310, as well as the electric submersible downhole cable insulation and lead jacket barrier. A number (but fewer compared to conventional systems) O-rings (e.g., 306, 308) may be used to seal various locations inside the shell (tape seal). Thin wall tubes and inexpensive shells allow for a reduced cost as well as a reduced overall diameter.

Figure 4:
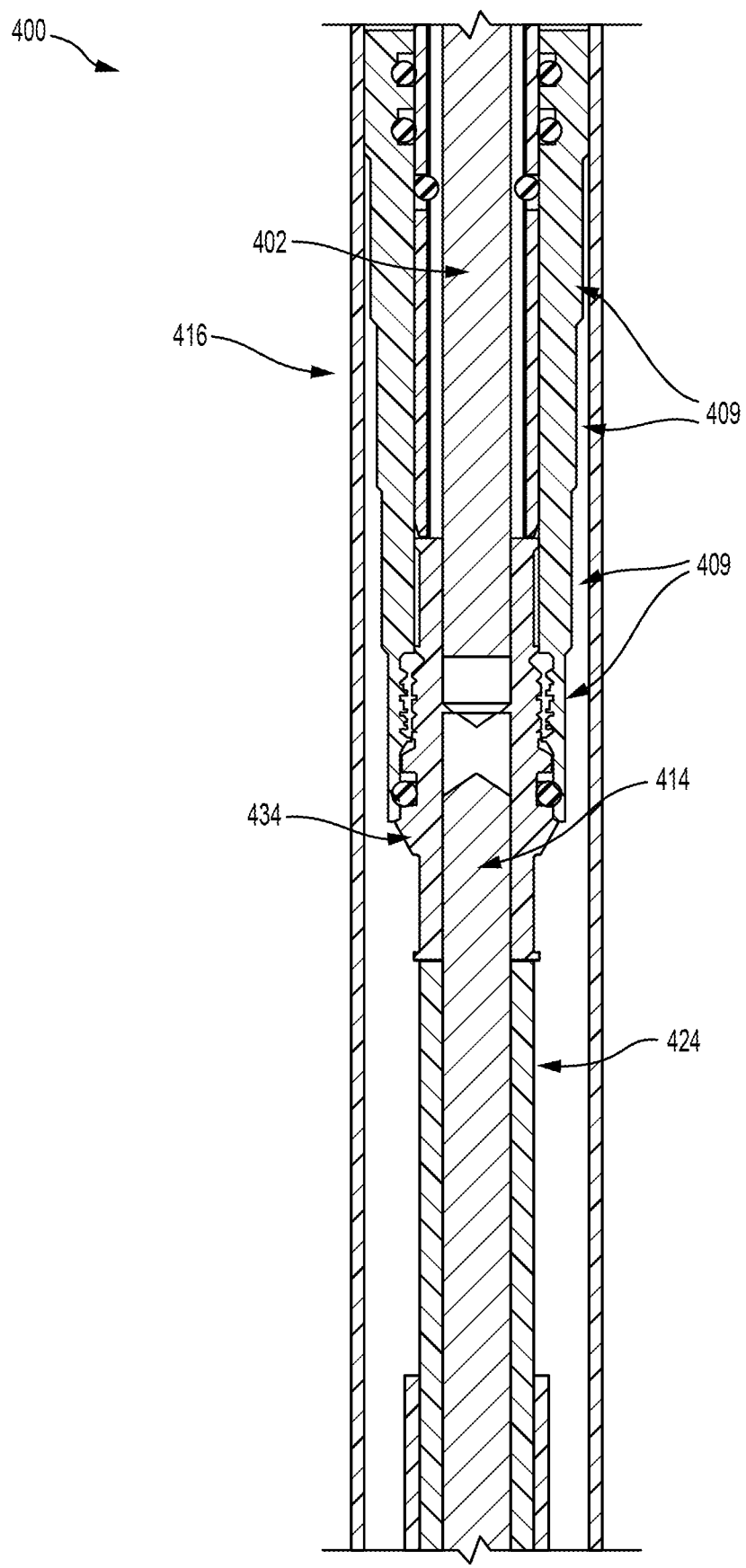
FIG. 4 illustrates a close-up cross-sectional view of a tape splice of an electric submersible pump cable and a tubing encapsulated surface-side cable according to embodiments.

FIG. 4 illustrates a close-up cross-sectional view of a tape splice of an electric submersible pump cable and a tubing encapsulated surface-side cable according to embodiments.

Diagram 400 shows the conductor 402 of the surface cable and the conductor 414 of the downhole cable 424 electrically coupled through crimped or crimp-free contacts inside the thermoplastic insulator 434. In the shown example, sealant tape 409 is applied starting around the thermoplastic insulator 434 and in increasing thickness toward the surface providing pressure-blocking, insulated seal. A thickness (i.e., number of layers of the sealant tape 409 at each stage) may be adjustable based on cable size. The staged increase of thickness provides the pressure-blocking seal and allows thinner shells to be used making an overall decrease of diameter of the splice smaller. Furthermore, a number of the stages (where a number of layers of sealant tape 409 is different at each stage), thereby a length of each stage, as well as thickness of each stage may be selected based on cable size and desired pressure block.

Tubing encapsulated cable is growing more common is oil and gas implementations due to a number of characteristics and for being cost effective. Example embodiments include joining and utilizing a tape splice and terminating to a thermoplastic insulator which seals to a tubing encapsulated cable, thereby maintaining well pressure and insulating the connection between surface and downhole cables with minimal components. Furthermore, there is no critical sized cable seal on splice terminations, and the tape seal layers can be easily wrapped to different sized cables while dependably sealing.

While the example configuration in diagrams 300 and 400 are shown with a crimp-free contact affixed to the tubing encapsulated cable and the submersible downhole cable, embodiments are not limited to the illustrative example. In other examples, the tubing encapsulated cable may be affixed with a crimp contact and the submersible downhole cable with a crimp-free contact. In yet other examples, both cables may be affixed with crimp or crimp-free contacts.

The surface cable inside the conduit may be secured to a conduit box, where the cables may be further spliced for further surface connections, connected to fuses, terminals, and other devices. In an example implementation, the tubing encapsulated cable may be #4 AWG Polyetheretherketone (PEEK) insulated pigtail cable in ⅜" metal tubing.

According to some examples, a cable splice assembly includes a tubing encapsulated cable; an electric submersible downhole cable, where the tubing encapsulated cable and the electric submersible downhole cable are tape-spliced through a pair of respective contacts; a thermoplastic insulator to seal the tubing encapsulated cable; a shell to contain the tape-spliced tubing encapsulated cable and the electric submersible downhole cable; and multiple layers of sealant tape wrapped around at least the tubing encapsulated cable and the thermoplastic insulator inside the shell, where a number of layers of the sealant tape is selected to create a pressure blocking seal inside the shell.

According to other examples, the thermoplastic insulator includes a surface-side insulator portion to envelope the tubing encapsulated cable inside the shell; and a downhole insulator portion to envelope the electric submersible downhole cable inside the shell, where the surface-side insulator portion and the downhole insulator portion include matching sets of threads to couple together. The sealant tape may be configured to begin wrapping around the downhole insulator portion of the thermoplastic insulator and wrap around the surface-side insulator portion of the thermoplastic insulator. The sealant tape may be further configured to wrap around the tubing insulated cable in an increasing diameter toward a surface such that a thickest portion of the sealant tape forms the pressure blocking seal with an inside surface of the shell.

According to further examples, the increasing diameter of the sealant tape may be achieved by a varying number of layers of the sealant tape in a preset number of stages with a first stage around the downhole insulator portion of the thermoplastic insulator having fewest layers and a last stage around the tubing encapsulated cable having the most layers to contact the inside surface of the shell. A number and a length of the stages may be selected based on one or more of a size of the tubing encapsulated cable, a thickness of the shell, or a desired strength of the formed pressure blocking seal. The cable splice assembly may further include a plurality of O-rings to seal one or more of the surface side insulator and the thermoplastic insulator inside the wrapped sealant tape. The cable splice assembly may also include a security mechanism to secure the tubing encapsulated cable to a top portion of the shell. The sealant tape may be further wrapped around at least a portion of the electric submersible downhole cable inside the shell. The tubing encapsulated cable may be #4 American wire gauge (AWG) cable covered by Polyetheretherketone (PEEK) insulator.

According to some examples, a method to form a cable splice assembly includes affixing a thermoplastic insulator to a tubing encapsulated cable; electrically coupling the tubing encapsulated cable and an electric submersible downhole cable inside the thermoplastic insulator; wrapping multiple layers of sealant tape around at least the tubing encapsulated cable and the thermoplastic insulator, where a thickness of the sealant tape is increased in stages starting around the thermoplastic insulator and in a direction of a wellhead; and disposing the electrically coupled portions of the tubing encapsulated cable and the electric submersible downhole cable inside a shell, where a thickness of the sealant tape is selected to create a pressure blocking seal inside the shell.

According to other examples, increasing the thickness of the sealant tape may include increasing a number of layers of the sealant tape at each stage. The method may further include selecting a number and a length of the stages based on one or more of a size of the tubing encapsulated cable, a thickness of the shell, or a desired strength of the formed pressure blocking seal. The method may also include surrounding the tubing encapsulated cable with a surface-side insulator in a vicinity of the electrical coupling; and surrounding the electric submersible downhole cable with a downhole insulator in a vicinity of the electrical coupling such that the surface-side insulator and the downhole insulator overlap at the electrical coupling.

According to further examples, the method may further include sealing one or more of the surface side insulator and the thermoplastic insulator inside the wrapped sealant tape through one or more O-rings. The method may also include securing the tubing encapsulated cable to a top portion of the shell through a security mechanism; wrapping the sealant tape further around at least a portion of the electric submersible downhole cable inside the shell; or electrically coupling the tubing encapsulated cable and the electric submersible downhole cable inside the thermoplastic insulator through crimped or crimp-free contacts. The electric submersible downhole cable may be further encapsulated in a lead jacket. The tubing encapsulated cable may be #4 American wire gauge (AWG) cable covered by Polyetheretherketone (PEEK) insulator.

The present disclosure is not to be limited in terms of the particular embodiments described in this application, which are intended as illustrations of various aspects. Many modifications and variations can be made without departing from its spirit and scope. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled. The terminology used herein is for the purpose of describing particular embodiments only and is not intended to be limiting.

The herein described subject matter sometimes illustrates different components contained within, or connected with, different other components. Such depicted architectures are merely examples, and in fact, many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

For any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments are possible. The various aspects and embodiments disclosed herein are for purposes of illustration and are not intended to be limiting, with the true scope and spirit being indicated by the following claims.

What is claimed is:

1. A cable splice assembly comprising:
a tubing encapsulated cable;
an electric submersible downhole cable, wherein the tubing encapsulated cable and the electric submersible downhole cable are tape-spliced through a pair of respective contacts;
a thermoplastic insulator to seal the tubing encapsulated cable, wherein the thermoplastic insulator seals the tubing encapsulated cable in a vicinity of the pair of respective contacts;
a shell to contain the tape-spliced tubing encapsulated cable and the electric submersible downhole cable; and
multiple layers of sealant tape wrapped around at least the tubing encapsulated cable and the thermoplastic insulator inside the shell, wherein a number of layers of the sealant tape is selected to create a pressure blocking seal inside the shell.

2. The cable splice assembly of claim 1, wherein
the sealant tape is configured to begin wrapping around the downhole insulator portion of the thermoplastic insulator and wrap around the surface-side insulator portion of the thermoplastic insulator.

3. The cable splice assembly of claim 2, wherein
the sealant tape is further configured to wrap around the tubing insulated cable in an increasing diameter toward a surface such that a thickest portion of the sealant tape forms the pressure blocking seal with an inside surface of the shell.

4. The cable splice assembly of claim 3, wherein
the increasing diameter of the sealant tape is achieved by a varying number of layers of the sealant tape in a preset number of stages with a first stage around the downhole insulator portion of the thermoplastic insulator having fewest layers and a last stage around the tubing encapsulated cable having the most layers to contact the inside surface of the shell.

5. The cable splice assembly of claim 4, wherein
a number and a length of the stages are selected based on one or more of a size of the tubing encapsulated cable, a thickness of the shell, or a desired strength of the formed pressure blocking seal.

6. The cable splice assembly of claim 1, further comprising:
a plurality of O-rings to seal one or more of the surface side insulator and the thermoplastic insulator inside the wrapped sealant tape.

7. The cable splice assembly of claim 1, further comprising:
a security mechanism to secure the tubing encapsulated cable to a top portion of the shell.

8. The cable splice assembly of claim 1, wherein the sealant tape is further wrapped around at least a portion of the electric submersible downhole cable inside the shell.

9. The cable splice assembly of claim 1, wherein the tubing encapsulated cable is #4 American wire gauge (AWG) cable covered by Polyetheretherketone (PEEK) insulator.

10. A method to form a cable splice assembly, the method comprising:
affixing a thermoplastic insulator to a tubing encapsulated cable;
electrically coupling the tubing encapsulated cable and an electric submersible downhole cable inside the thermoplastic insulator through a pair of respective contacts, wherein the thermoplastic insulator seals the tubing encapsulated cable in a vicinity of the pair of respective contacts;
wrapping multiple layers of sealant tape around at least the tubing encapsulated cable and the thermoplastic insulator, wherein a thickness of the sealant tape is increased in stages starting around the thermoplastic insulator and in a direction of a wellhead; and
disposing the electrically coupled portions of the tubing encapsulated cable and the electric submersible downhole cable inside a shell, wherein a thickness of the sealant tape is selected to create a pressure blocking seal inside the shell.

11. The method of claim 10, increasing the thickness of the sealant tape comprises:
increasing a number of layers of the sealant tape at each stage.

12. The method of claim 10, further comprising:
selecting a number and a length of the stages based on one or more of a size of the tubing encapsulated cable, a thickness of the shell, or a desired strength of the formed pressure blocking seal.

13. The method of claim 10, further comprising:
surrounding the tubing encapsulated cable with a surface-side insulator in a vicinity of the electrical coupling; and
surrounding the electric submersible downhole cable with a downhole insulator in a vicinity of the electrical coupling such that the surface-side insulator and the downhole insulator overlap at the electrical coupling.

14. The method of claim 13, further comprising:
sealing one or more of the surface side insulator and the thermoplastic insulator inside the wrapped sealant tape through one or more O-rings.

15. The method of claim 10, further comprising:
securing the tubing encapsulated cable to a top portion of the shell through a security mechanism.

16. The method of claim 10, further comprising:
wrapping the sealant tape further around at least a portion of the electric submersible downhole cable inside the shell.

17. The method of claim 10, further comprising:
electrically coupling the tubing encapsulated cable and the electric submersible downhole cable inside the thermoplastic insulator through crimped or crimp-free contacts.

18. The method of claim 10, wherein the electric submersible downhole cable is further encapsulated in a lead jacket.

19. The method of claim 10, wherein the tubing encapsulated cable is #4 American wire gauge (AWG) cable covered by Polyetheretherketone (PEEK) insulator.

* * * * *